(12) United States Patent
Stone et al.

(10) Patent No.: US 7,217,206 B2
(45) Date of Patent: May 15, 2007

(54) ACTIVE TENSIONER

(75) Inventors: Roger Stone, Brighton (GB); Brian Knight, Shoreham-by-Sea (GB); Daniele Zecchetti, Southwick (GB)

(73) Assignee: The Gates Corporation, Denver, CO (US)

( * ) Notice: Subject to any disclaimer, the term of this patent is extended or adjusted under 35 U.S.C. 154(b) by 415 days.

(21) Appl. No.: 10/736,121

(22) Filed: Dec. 15, 2003

(65) Prior Publication Data

US 2005/0192142 A1 Sep. 1, 2005

Related U.S. Application Data

(60) Provisional application No. 60/434,138, filed on Dec. 16, 2002.

(51) Int. Cl.
*F16H 7/08* (2006.01)

(52) U.S. Cl. .................................................. 474/110

(58) Field of Classification Search ............ 474/69, 474/70, 101, 109, 110, 139
See application file for complete search history.

(56) References Cited

U.S. PATENT DOCUMENTS

| | | | |
|---|---|---|---|
| 4,298,342 A | 11/1981 | Clayton et al. ............ 474/110 |
| RE31,698 E | 10/1984 | Sansome et al. .......... 73/862.65 |
| 4,478,595 A | 10/1984 | Hayakawa et al. ......... 474/109 |
| 4,573,952 A | 3/1986 | Schulze ..................... 474/110 |
| 4,770,049 A | 9/1988 | Jones et al. .............. 73/862.65 |
| 4,854,798 A | 8/1989 | Snyder et al. .............. 411/434 |
| 5,439,420 A | 8/1995 | Meckstroth et al. ........ 474/133 |
| 5,531,648 A | 7/1996 | Meckstroth et al. ........ 474/110 |
| 5,632,698 A | 5/1997 | Suzuki ....................... 474/110 |
| 5,733,214 A | 3/1998 | Shiki et al. ................... 474/69 |
| 5,752,891 A | 5/1998 | Meckstroth et al. ........ 474/110 |
| 6,572,501 B2 * | 6/2003 | Winklhofer ................. 474/102 |
| 6,849,011 B2 * | 2/2005 | Calfa et al. ................. 474/102 |
| 2005/0209034 A1* | 9/2005 | Ellsworth et al. ........... 474/101 |

FOREIGN PATENT DOCUMENTS

GB 2188440 A * 9/1987
JP 02118252 A * 5/1990

* cited by examiner

*Primary Examiner*—Vicky A. Johnson
(74) *Attorney, Agent, or Firm*—J. A. Thurnau, Esq.; C. H. Castleman, Esq.; J. I. Mahurin, Esq.

(57) ABSTRACT

An automatic tensioner having a load cell for detecting and controlling a power transmission belt tension. The tensioner comprises a lead screw driven by an electric motor for setting a lever arm/pulley position and thereby a belt load. The tensioner also comprises a load cell engaged with a tensioner lead screw for detecting a belt load. The tensioner motor is controlled loop using a load cell signal. The controller compares a detected belt load from the load cell with a predetermined belt load value to identify a desired belt load and thereby set a tensioner lever arm position corresponding to said desired belt load. The tensioner may also be controlled by an engine operating condition.

30 Claims, 14 Drawing Sheets

ACTIVE TENSIONER

REFERENCE TO RELATED APPLICATIONS

This application claims priority from U.S. provisional patent application Ser. No. 60/434,138 filed Dec. 16, 2002.

FIELD OF THE INVENTION

The invention relates to a tensioner, more particularly, to an automatic tensioner that controls a belt tension according to a load cell signal, or engine operating condition.

BACKGROUND OF THE INVENTION

Vehicle engines include among other things, accessories which are driven by the engine. Accessories may include a power steering pump, an air conditioning compressor, alternator and so on. Each of these accessories has a pulley which is connected by a belt or belts to an engine crankshaft. The accessories are driven by the belt or belts as the crankshaft rotates.

In order to operate efficiently it is necessary for the belt to be placed under a certain amount of preload or tension. This may be accomplished using known methods. A moveable shaft on one of the accessories may be mechanically adjusted to tension a belt. Another method includes use of a belt tensioner.

A belt tensioner comprises a spring imparting a force upon a lever arm. The lever arm typically comprises a pulley journalled thereto. The pulley is in contact with a belt. A biasing member such as a spring in the tensioner is used to impart and maintain a belt load. The belt load is a function of the geometry of the tensioner as well as the spring rate of the tensioner spring.

Actuators have been used to control a tensioner position, and thereby a belt tension. For example they are used to adjust a phase difference between a driver and driven pulley. The control signal is derived from the relative rotational phase of a driver pulley as compared to a driven pulley.

Representative of the art is U.S. Pat. No. 5,733,214 (1998) to Shiki et al. which discloses a system for adjusting the tension of an endless transmitting belt in an internal combustion engine comprising a control system for adjusting a tension to be applied from a tensioner to an endless belt based upon a phase angle between a driver and a driven pulley.

What is needed is an automatic tensioner controlled by a belt load detected by a load cell. What is needed is an automatic tensioner responsive to an engine operating condition to control a belt tension. The present invention meets these needs.

SUMMARY OF THE INVENTION

The primary aspect of the invention is to provide an automatic tensioner controlled by a belt load detected by a load cell.

Another aspect of the invention is to provide an automatic tensioner responsive to an engine operating condition to control a belt tension.

Other aspects of the invention will be pointed out or made apparent by the following description of the invention and the accompanying drawings.

An automatic tensioner having a load cell for detecting and controlling a power transmission belt tension. The tensioner comprises a lead screw driven by an electric motor for setting a lever arm/pulley position and thereby a belt load. The tensioner also comprises a load cell engaged with a tensioner lead screw for detecting a belt load. The tensioner motor is controlled loop using a load cell signal. The controller compares a detected belt load from the load cell with a predetermined belt load value to identify a desired belt load and thereby set a tensioner lever arm position corresponding to said desired belt load. The tensioner may also be controlled by an engine operating condition.

BRIEF DESCRIPTION OF THE DRAWINGS

FIG. 16($b$) is a logic diagram for the actuator current feedback calculation.
FIG. 16($c$) is a logic diagram for the load cell calibration.
FIG. 16($d$) is a logic diagram for the engine speed calculation.
FIG. 16($e$) is a logic diagram for the auto/manual control of the PWM.
FIG. 16($f$) is a logic diagram for the HBRIDGE1.

DESCRIPTION OF THE INVENTION

Figure 1:
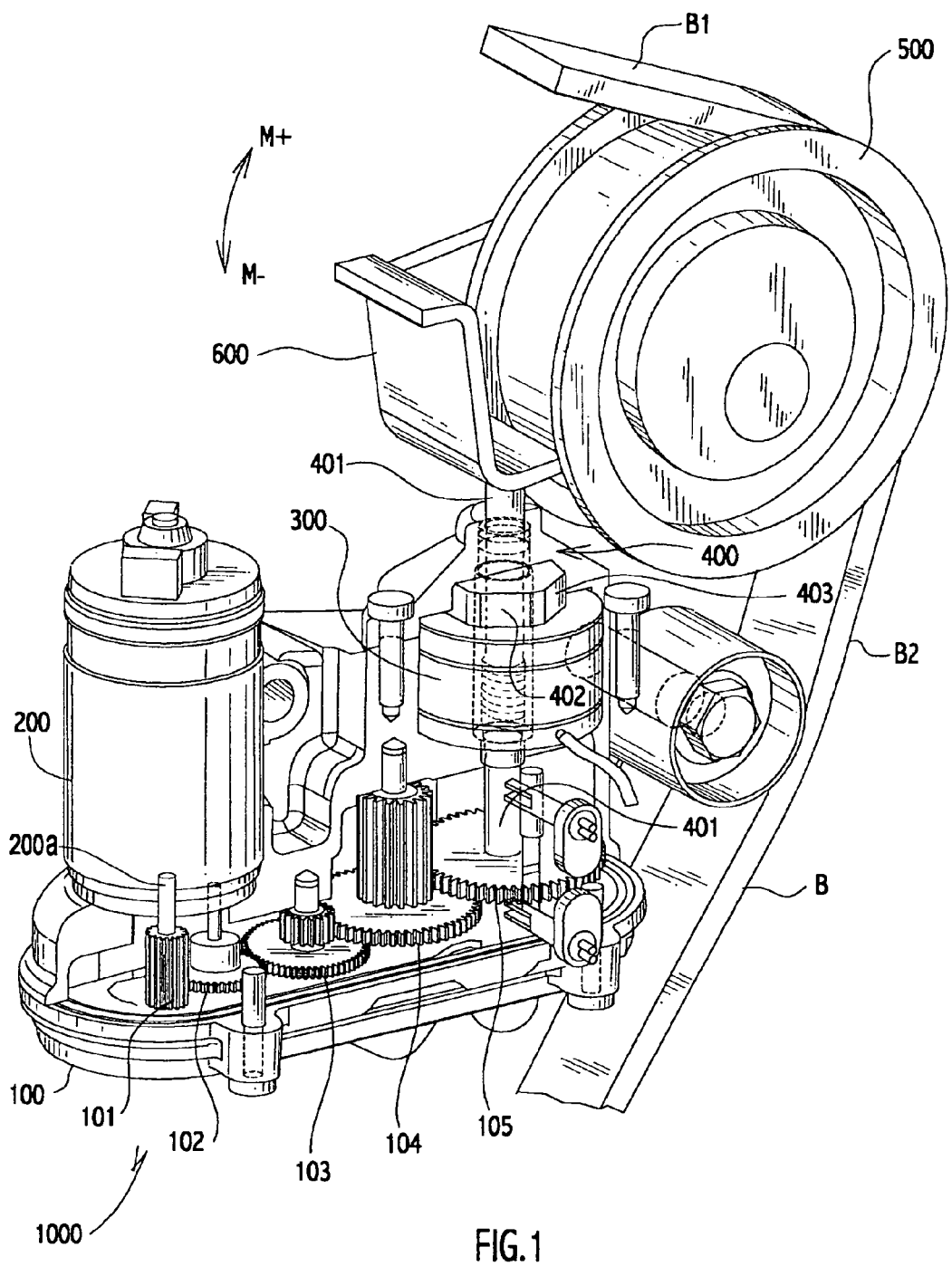
FIG. 1 is a perspective view of the tensioner in a belt drive system.

FIG. 1 is a perspective view of the tensioner in a belt drive system. The invention provides the capability of varying a force applied by a belt tensioner to a power transmission belt according to changing engine requirements during engine operation. Active, real time control of a tensioner arm position allows an optimum tension to be applied to a belt at all times, as opposed to a prior art arrangement which imparts a predetermined force based upon a predetermined tensioner biasing member position and belt tension requirement.

The inventive tensioner and system also includes electronically controlled damping. More particularly, damping a dynamic response of the tensioner to dynamic forces applied to the tensioner during engine operating conditions by the dynamic behavior of the drive. A damping parameter can be set to be infinite, that is, the tensioner controller calculates a required tension for a specific operating condition. It then applies the proper tension to the belt through a pulley and does not respond (move) to the dynamic (high frequency) tension variations that then occur during operation in the belt.

In the case of damping parameters less than infinity, the dynamic tensions can be reduced by changing a belt system resonance frequency by applying continuous belt tension adjustments. Continuous tension adjustments allow the belt to be operated at a lower average tension which directly increases belt life. This also applies not only to the belt but also other components in the system as well, bearings for example.

Another advantage of the tensioner includes significantly reduced noise levels because it is not necessary to compromise between the tension levels required for different engine conditions, for example, high speed operation and idle. An optimum setting is specified by the controller for each operating condition. A low belt tension is set at idle when demands on the belt are at a minimum, and a higher belt tension is set for engine operation over a predetermined speed, for example 2000 RPM or for periods of high belt acceleration or deceleration.

The tensioner comprises an actuator based upon a lead screw concept. One end of a lead-screw is in contact with a tensioner lever arm, which is pivotably connected to a base, for example, an engine. An eccentrically mounted pulley is journalled to an end of the lever arm. The pulley bears on the belt and through this contact a belt tension is created. The lead-screw is moveable axially, more particularly, when the lead screw is rotated by a gear train through a threaded extended nut or collar the lead screw moves in an axial direction. Axial movement of the lead screw moves the lever arm, thereby altering a tension in a belt. An extended nut or collar threadably engaged with the lead screw is prevented from turning by a hexagonal end fitting into a female hexagonal feature in a tensioner end cover.

The extended nut or collar is located by a female hexagonal feature in the tensioner end cover and by a bore at the opposite end. This allows the extended nut and therefore the lead-screw to float along its axis. The hexagonal part of the extended nut bears upon a load spreading washer and in turn on a spacer, and finally on the load sensing device, or load cell. The load sensing device comprises a 'dough-nut' or toroid load cell with a central opening through which the lead screw coaxially extends. The spacer can be made from different materials to provide differing degrees of damping as required, for example, elastomeric, plastic or metal.

A lead screw driving force is provided by an actuator motor comprising a 12V DC electric motor known in the art, which is advantageously sized to connect to an engine electrical system. The motor may also comprise 42V or such other voltage as may be most advantageous for a particular engine electrical system. Exemplary motors are manufactured by Johnson Motor and Igarashi, although other suitable motors are readily available in the marketplace as well. The driving force is transmitted from the actuator to the lead screw by a reduction gear transmission.

The load cell measures an axial load on the lead screw from the lever arm. The axial load data, and the known geometry of the lever arm and tensioner pulley, are used to calculate or determine a tension in the belt.

More particularly, referring to FIG. 1, tensioner 1000 comprises gearbox 100, actuator 200, load cell 300, lead screw assembly 400, pulley 500 and lever arm 600. Gearbox 100 comprises a reduction transmission comprising gears 101, 102, 103, 104, and 105. Gears 101 thru 105 are exemplary and are not intended to limit the number of gears that may be used in the gearbox. Of course, any number of gears may be used to achieve a desired gear reduction. Actuator 200 is connected to gear 101. Lead screw 401 is connected to gear 105. The gear reduction accomplished by gearbox 100 is in the range of 100 to 1.

Lead screw 401 is a force imparting member which coaxially extends through the center bore of a toroid shaped load cell 300. Lead screw shaft 402 is threadably engaged with extended nut or collar 403. As lead screw 401 is turned by action of gear 105, lead screw 401 moves axially along its major axis moving arm 600 in either a M+ or M− direction. This, in turn, increases a belt tension which increases or decreases a force upon collar 402. In turn, collar 402 bears upon load cell 300. Load cell 300, a load sensor, generates and sends a load cell signal to the controller as described more fully herein. The load cell signal in indicative of the belt load and hence belt tension.

Load cell 300 may alternatively comprise a "button" type load cell which receives a load directly from the lead shaft 401 bearing directly upon the load cell. Alternatively, load cell 300 may comprise a piezoelectric material such as a quartz or ceramic element which produces a voltage when subjected to a compressive or tensile strain.

Figure 2:
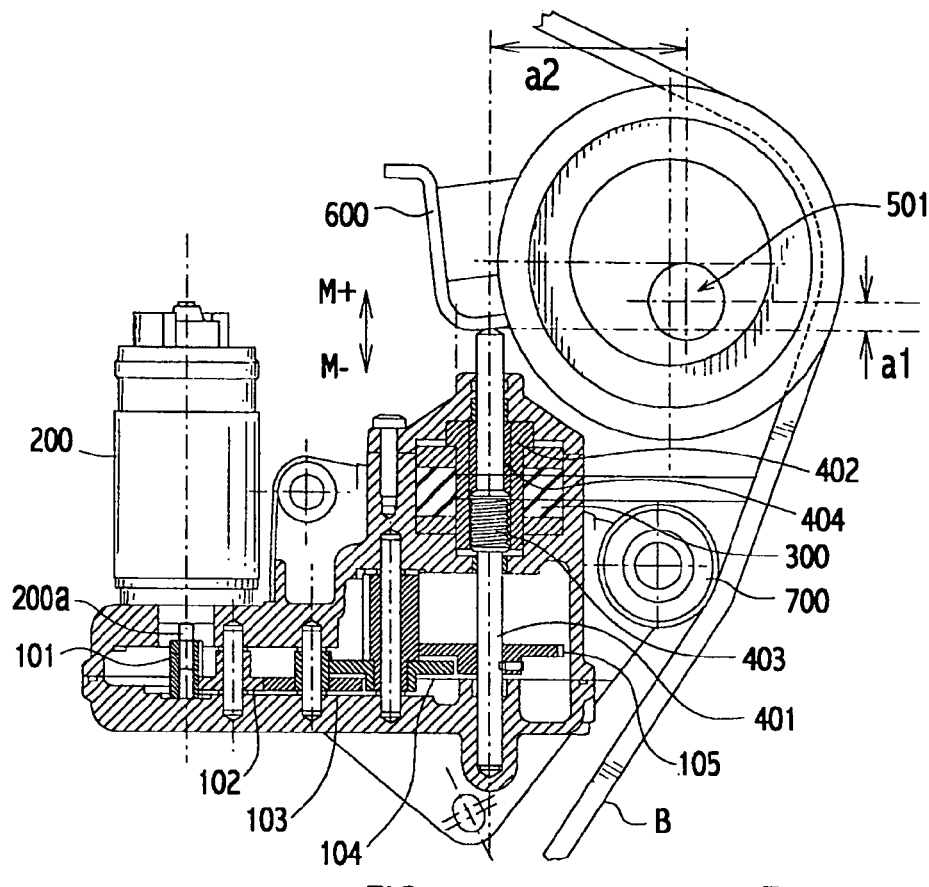
FIG. 2 is a cross-sectional view of the tensioner.

Lever arm 600 pivots about a pivot point 501 (see FIG. 2). Lead screw 401 is engaged with lever arm 600. Movement of lever arm 600 in direction M+ causes a belt tension to increase thereby increasing a force imparted to load cell 300 by lead screw 401. Movement of lever arm 600 in direction M− causes a belt tension to decrease, thereby decreasing a force imparted to load cell 300 by lead screw 401.

FIG. 2 is a cross-sectional view of the tensioner. Lead screw 401 comprises threaded portion 403 which engages a threaded inner bore portion 404 of nut or collar 402. Collar 402 bears upon load cell 300. As previously described, a movement of shaft 401 in a direction M+ collar 300 increases a force imparted to a belt and therefore to load cell 300. Idler pulley 700 serves to further stabilize belt operation.

A distance (a1) is a distance from the lead screw contact point with the lever arm to the pivot point 501 in the lead screw force direction. A distance (a2) is a distance from the lead screw contact point with the lever arm to the pivot point 501 perpendicular to the lead screw force direction. These comprise the variables of the geometric relationship that determine the particular mechanical advantage realized by a given tensioner configuration.

Figure 3:
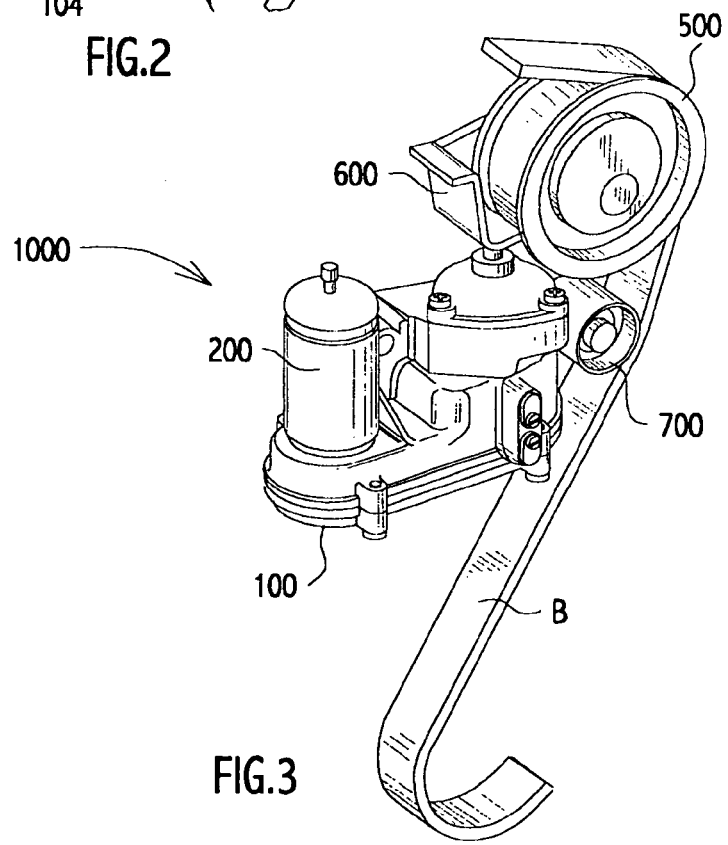
FIG. 3 is a front perspective view of the tensioner in a belt drive system.

FIG. 3 is a front perspective view of the tensioner in a belt drive system. Tensioner 1000 is shown in a portion of an exemplary belt drive system. A portion of belt B is shown trained about a pulley 500, pulley 700 as well as other pulleys in the system (not shown). Other pulleys in the system may comprise, but be not limited to, pulleys connected to an air conditioner compressor, power steering pump, fuel injection pump, oil pump, alternator or generator/starter and so on.

Figure 4:
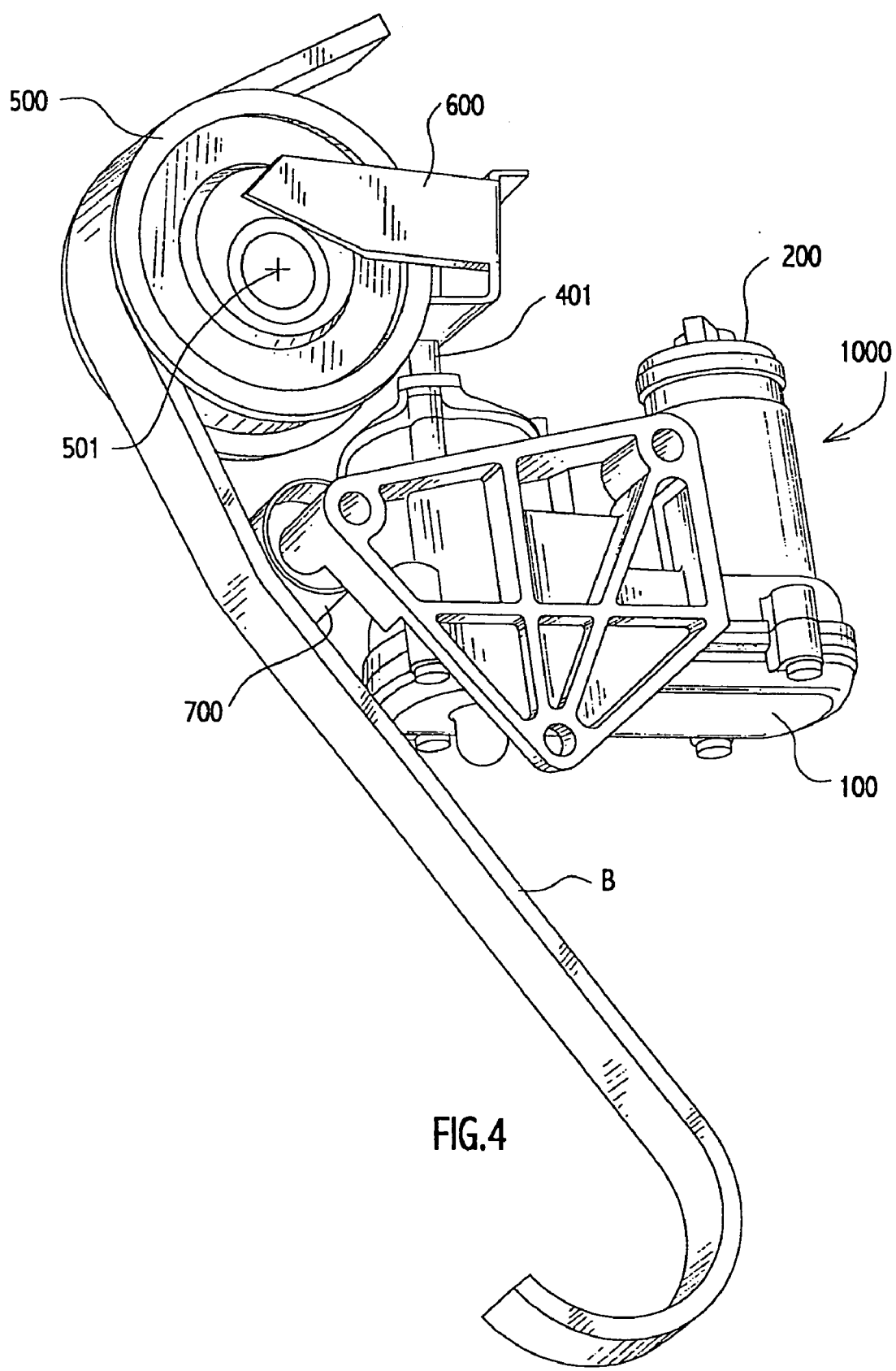
FIG. 4 is a rear perspective view of the tensioner.

FIG. 4 is a rear perspective view of the tensioner. Lever arm 600 is shown. Lead screw 401 engages lever arm 600. Pulley 500 is journalled to lever arm 600.

Figure 5:
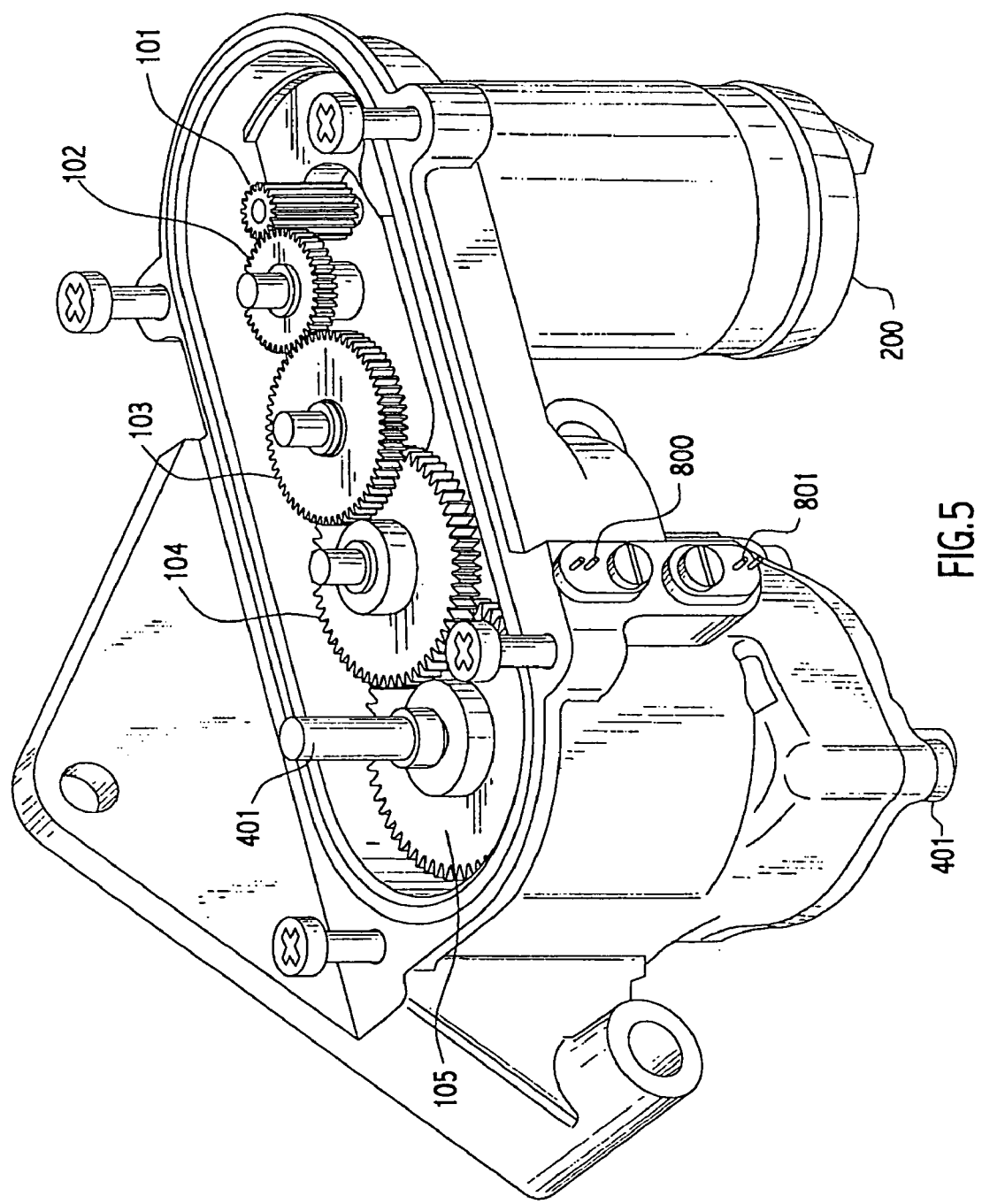
FIG. 5 is a view of the gearbox.

FIG. 5 is a view of the gearbox. A gear train comprising gears 101, 102, 103, 104, 105 is shown with a gearbox cover removed. Gear 101 is connected to an actuator drive shaft. Limit switches 800 and 801 are used to control operation of actuator 200, which in turn limits a full travel range of lead screw 401. Gear 105 moves axially along gear 104 as the lead screw 401 moves axially. Engagement of either limit switch 800, 801 by lead screw gear 105 at either end of the travel range will cause actuator 200 to stop, thereby avoiding an overload condition which could damage the gear train, actuator or belt.

In order to reduce the overall envelope or physical size of the tensioner, alternatively, gear 101 of the gear train can comprise a hypoid gear arrangement. Namely, gear 101 comprises a hypoid gear, known in the art, whereby the drive shaft 200a of the actuator 200 drives an outer periphery of gear 101. This can also result in a reduction of the number of gears used in the gear train.

The tensioner operation and thereby position is controlled by an electronic control system. The system comprises a controller having a processor which controls a tensioner lead screw position and thereby a belt tension. The controller receives and operates according to various inputs. The controller also maps an optimized tensioner belt load on lead screw position characteristic against any input parameter. The position characteristic is either computed according to a relationship or selected or looked up from a map in a controller memory. The input parameters are combined, again either by look up or by computation, to give a specific control output value which in turn controls a lead screw force, thereby setting a desired belt tension. A memory is also provided for storing data collected from the system sensors.

A lead screw force, and thereby a belt tension, is controlled by a lead screw force feedback loop, realized through the load cell. Other control variables may include engine speed, load or throttle position, engine transmission gear ratio, engine coolant and/or oil temperatures, road speed, and belt noise signal. This list of variables is exemplary and may not include all possible variables that may be used to control the tensioner. This control protocol may also be realized with a feedforward or pre-control term whereby a predetermined lead screw force is input to the system.

The variables may also be manipulated, e.g. the first differential of engine speed to give engine acceleration. The first differential of throttle movement will give a rate of change of an engine throttle position as an indicator of the driver demand, also requiring a change in belt tension. High acceleration and deceleration of the engine, for example 10,000 RPM/second can also require commensurately rapid changes in belt tension as well.

A tensioner diagnostic system can be combined with the active tensioner. A tensioner diagnostic system can function in a number of different ways. For example, a temperature sensor is used to maintain a complete time and temperature history for the belt environment. The history is stored in a controller memory. The information is accessed for comparison to an equivalent period at a fixed temperature using the Arhennius relationship. This is then compared with a predefined belt life at certain levels, including for example, warning and "urgent" levels. This covers many of the effects which can arise from rubber aging, including but not limited to, back cracks, compound hardening, jacket cracks, and cord deterioration. A warning is sent to a user interface known in the art (for example a CRT or LCD display) by the system in the event a predetermined threshold value is exceeded.

A further use of the temperature sensor is to monitor the number of cycles of extreme cold starts to which the system, and belt, are exposed. This allows identification of additional cord fatigue arising from such extreme operating conditions. The information is recorded as additional cumulative damage into the model. The information is also used to determine the extent to which a cold start at a particular temperature is more damaging after temperature aging than on a new belt. This in turn is used to better predict belt aging and ultimate belt failure.

A tensioner diagnostic also functions on the basis of measuring the belt modulus (or the apparent belt modulus). The tensioner controller goes through a diagnostic cycle at appropriate points in the engine operating cycle—most preferably at each engine shutdown. The process comprises cycling the tensioner through two specific conditions before the tensioner goes to a predetermined engine stop condition. The conditions give load (L) and position (P) measurements—L1, P1 & L2, P2. These allow an elastic modulus for each belt strand on each side of the tensioner to be computed. The modulus is compared with a reference value stored in a controller memory at the time the belt was originally specified, and with an average value over the first 10 or 20 starts after the belt is fitted, and then with an average of the most recent 10 or 20 starts.

The modulus comparison allows an initial check that a belt of the right modulus has been fitted, followed by establishing a reasonable determination of the actual modulus within a predetermined range for that particular belt. For example, the controller can collect information for 10 start-stop cycles after belt replacement. An initial belt elastic modulus is then calculated using the collected information. The initial elastic modulus is then stored in a controller memory. This initial elastic modulus is then the basis for fatigue estimation by trending elastic modulus decay over an operating life of the belt. It allows adjustment of set point tensions to take account of the actual belt modulus at any point in the belt life. The check of elastic modulus against an average of a certain number of recent cycles allows identification of a developing elastic modulus issue over a short length of belt—perhaps as a result of crimping or damage due to a foreign body getting between the belt and a pulley. These problems would manifest in terms of a decreasing modulus. The rate of change of the modulus decrease would be used to predict remaining belt life.

The measurement conditions L1/P1, L2/P2 may be defined by specifying the loads and measuring the positions or vice versa. Specifying predetermined positions has the advantage of allowing limit switches 800, 801 to be used, rather than a full range position sensor. This decreases system complexity. Position may also be determined by driving the actuator with a fixed duty cycle for a fixed duration based on prior knowledge of time to reach a given position (P1). The load (L1) is then determined. The actuator is then driven with a fixed duty cycle for a second duration based on knowledge of time to reach the second position (P2). The second load (L2) is then determined. The manner of calculating belt modulus is readily known in the art.

The elastic modulus values allow cumulative detection of certain belt failure modes, including cord fatigue, edge wear and root cracking (both on belt leading and trailing edges if the pulleys on both sides of the tensioner are grooved). As previously mentioned, detection of crimping and other, localized physical damage would also be detected.

Further, an identifiable reference tooth, see FIG. 18, may be placed on the belt. Using a reference tooth a belt elastic modulus around an entire belt length may be mapped. This information is useful because a belt elastic modulus in the case of a spiral wound tensile cord is not a constant value along an entire belt length. Determination of an elastic modulus value for a particular belt portion greatly improves the accuracy of cord fatigue measurements. It also has the advantage of creating an accurate representation of an entire belt elastic modulus since the entire belt is sampled, rather than relying on an arbitrary number of measurements distributed about a belt.

Another advantage of the system is based upon connecting the tensioner control unit to an engine management system. Connecting it to the engine management system allows a number of cumulative belt cycles to be counted according to each time the reference tooth passes a sensor. Further, the tension applied to the belt and the operating temperature for each cycle can be detected and stored. This provides yet more information for determining a belt cord fatigue condition.

Yet another advantage is the elimination of a specified belt change interval. Currently, belt change intervals are somewhat arbitrary and conservative, so a majority of belts are changed long before they need be. Use of the inventive system will result in a major increase in average belt life since a belt change interval will be determined by actual measurements instead of a conservative estimation. Further improved reliability will be realized as incipient failure is detected before actual failure occurs, regardless of actual operating time.

Figure 6:
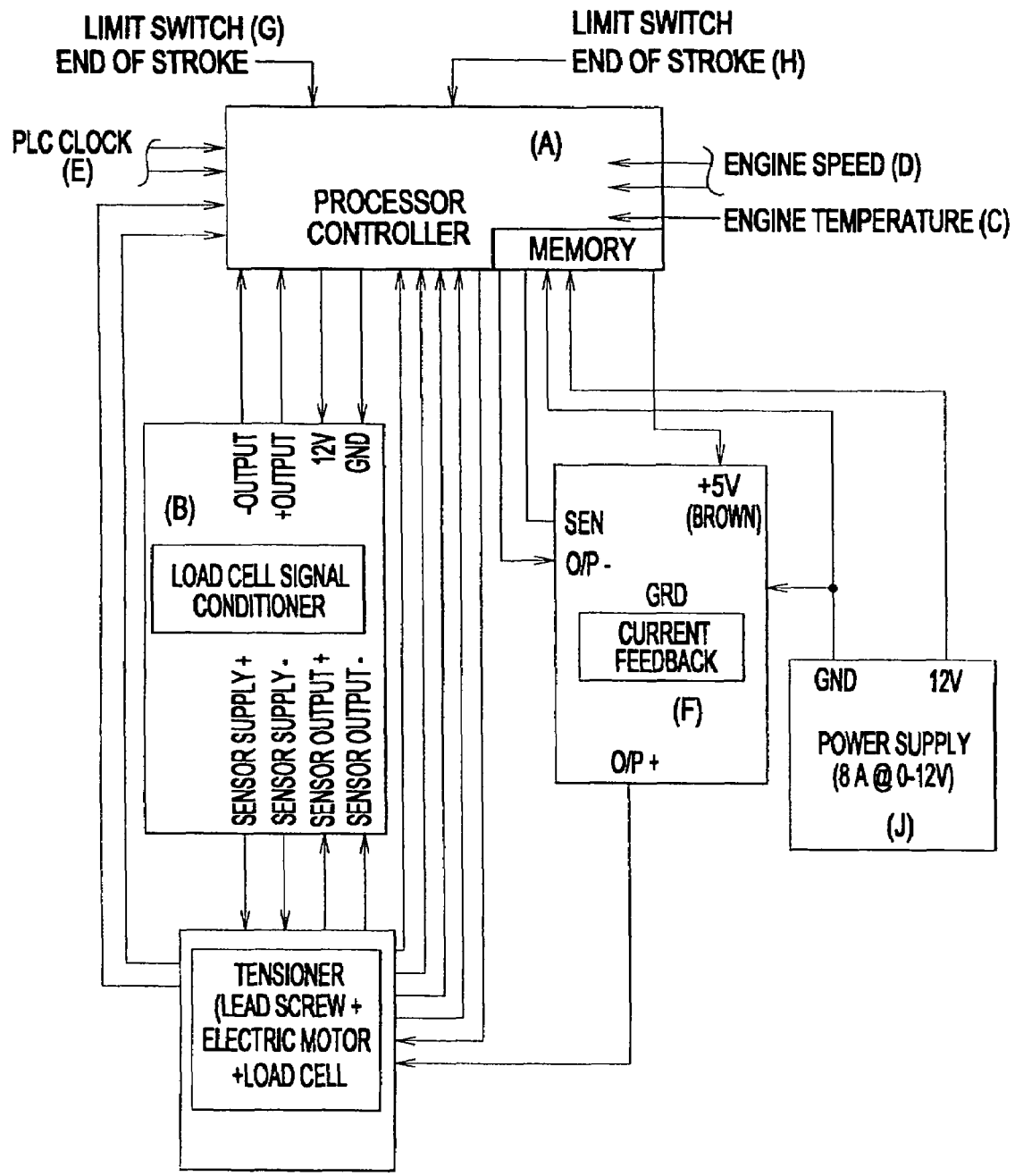
FIG. 6 is a schematic diagram of the tensioner control unit.

FIG. 6 is a schematic diagram of the tensioner control module. The control module (A) receives various inputs and generates various outputs (control signals) for the tensioner. Exemplary inputs are 1) force acting on actuator lead screw as measured by the load cell (B), 2) engine temperature measured by thermistor (C), 3) engine speed (D), 4) synchronization clock signal (E), 5) actuator electric motor current feedback (F), 6) end of stroke in direction 1 from limit switch 800 (G), 7) end of stroke in direction 2 from limit switch 801 (H). Control system outputs are the pulse width modulation signal (defined in value and sign or direction) to an H-bridge driver. In the case of an H-bridge driver the current can be positive and negative giving thus a double direction of movement of the actuator 400. The system is powered by connection to the vehicle 12V electrical system (J).

The belt tension control is based on feedback control from a load cell signal. A belt tension is calculated from a force on the lead screw, and thereby on the load cell, by means of a trigonometric relationship based upon belt wrap angle and the typical geometry of the tensioning pulley/lever arm.

More particularly:
T=belt force
θ=belt wrap angle around pulley
$F_p$=Force acting on the pulley hub
F=Force acting on the actuator screw
a1=distance from lead screw application force to pulley pivot taken in force direction
a2=distance from lead screw application force to pulley pivot taken perpendicular to force direction A force acting on the screw is:

$$F=F_p*(a1/a2)$$

And $$F_p=2*T*\sin(\theta/2)$$

For the purposes of this calculation it is assumed that the lead screw stroke is sufficiently small so as not to significantly affect distances a1 and a2 and wrap angle θ.

For example:
θ=86.45°
a1=10 mm
a2=45.5 mm

The tension control system uses two modes to calculate the value of the lead screw force used as a reference control loop. One of these modes computes a target lead screw force based on a target belt tension. Alternatively, the target lead screw force can be obtained from a look-up map as a function of engine speed.

Using the target belt tension mode, a lead screw force can be calculated using the formula:

$$F=2*T*\sin(\theta/2)*(a1/a2)$$

Where:
a1 and a2 are noted previously
T=corrected value of belt tension
θ=belt wrap angle Once the desired lead screw force is determined, the controller signals the actuator to operate in a first or second direction, thereby moving the lead screw to increase or decrease a lead screw force and thereby a belt tension. A signal from the load cell is continuously compared against the target lead screw force. When the target lead screw force is achieved, the controller stops the lead screw actuator. If a limit switch is activated, the controller will stop operation of the actuator on receipt of the limit switch signal.

Figure 7:
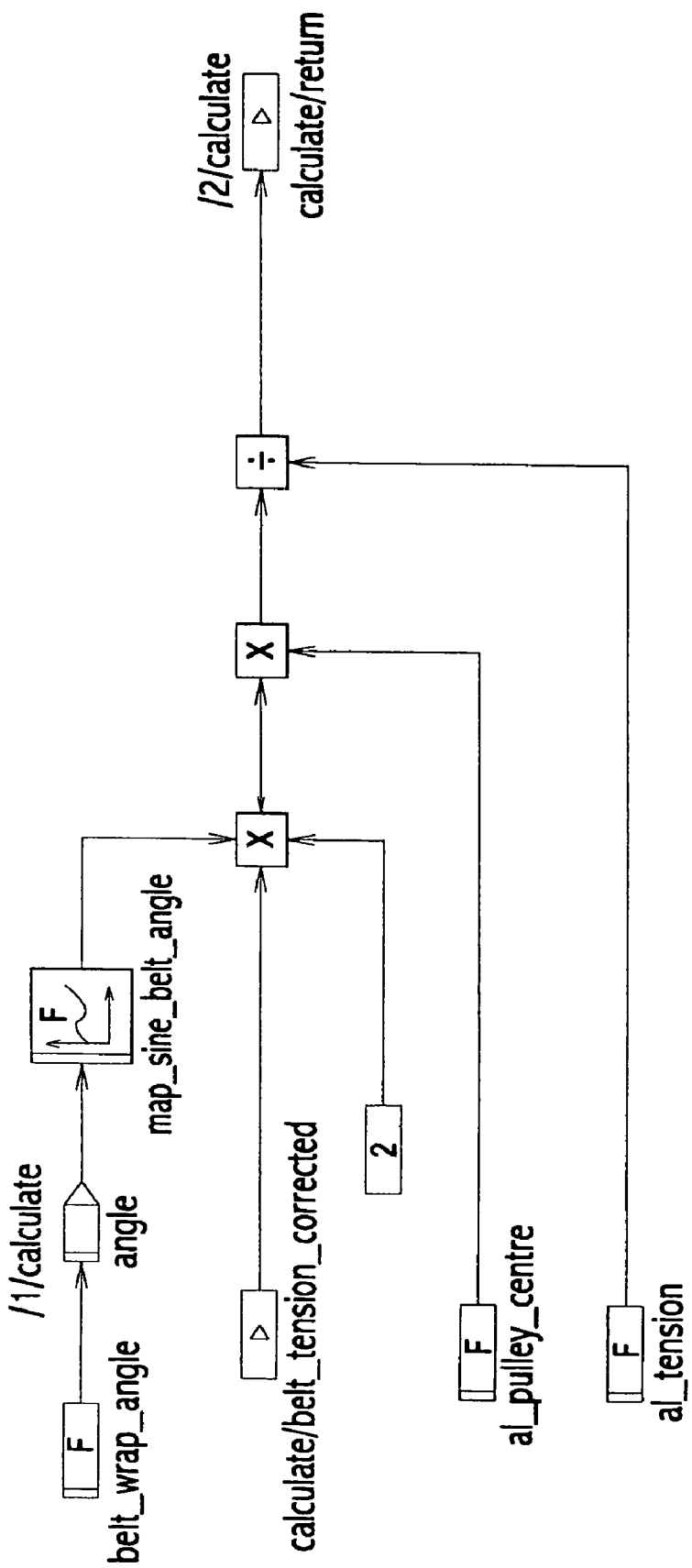
FIG. 7 is a logic diagram for controlling a belt tension.

FIG. 7 is a logic diagram for controlling a belt tension. The variables belt_wrap_angle, al_pulley_center, and al_tension are input scalar values based upon the particular belt system in which the tensioner is used.

The parameter map_sine_belt_angle is obtained from a look up table stored in the system memory.

A target lead screw force is controlled by means of a proportional, integral and derivative (PID) controller with anti-windup functionality. The implementation of the anti-windup provides, as calibrated parameters, the proportional, the integral, the derivative and the anti-windup gain.

Figure 8:
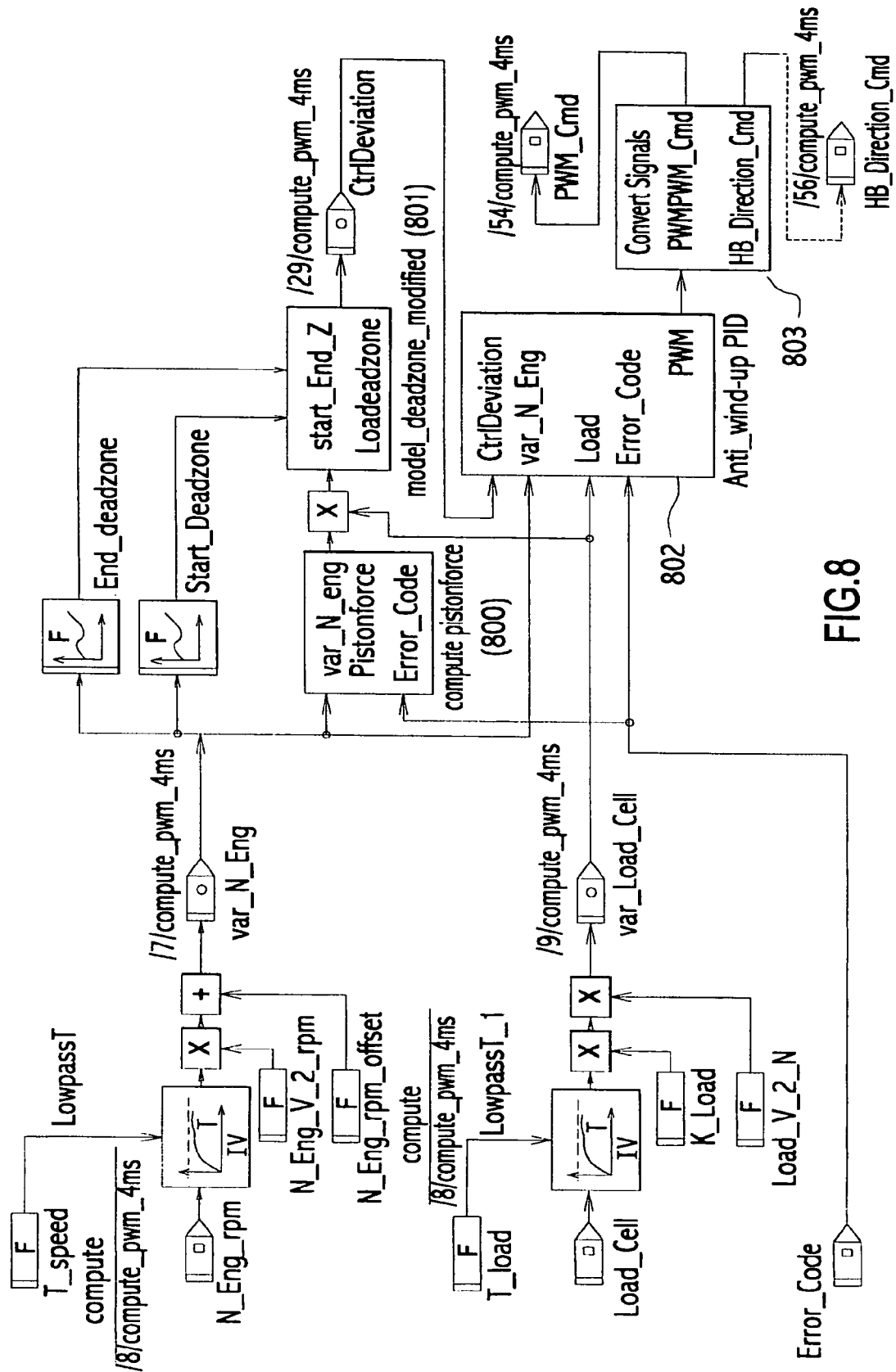
FIG. 8 is a logic diagram for the feedback control and PWM processes.

FIG. 8 is a logic diagram for the feedback control and pulse width modulation (PWM) processes. PWM is a method used to supply the actuator with a variable voltage between 0 volts and a reference value without using a transformer. FIG. 8 depicts the top-level functionality for the active tensioner. The cycle time for calculating the control algorithms is approximately 0.004 s. Digital low pass filters are applied to the engine speed (N_Eng_rpm) and the load cell signal (LoadCell) for use for control purposes.

The following hierarchies are provided and described in FIG. 8.
1) compute pistonforce 800: In this hierarchy a target lead screw force is calculated. As described previously, two modes can be used to obtain the lead screw force, see also FIG. 9.
   a. Computation of a lead screw force from the target belt tension using a simple trigonometric relationship, described above. An engine speed is used as a break point to read a target belt tension from a map. A saturation block ensures that the belt tension lies within a calibratable range.
   b. A target lead screw force can be read directly from a lookup table as a function of engine speed.
2) Deadzone 801: This provides a deadzone applied on the error signal of the PID control loop, see FIG. 10.
3) Anti-wind-up PID 802: This is a PID controller to control the lead screw force and it avoids the windup effect of the integral term, see FIG. 11.
4) Convert signals 803: This converts the PID controller output to the appropriate PWM signal to drive the actuator motor, see FIG. 12.

The variables T_SPEED (tensioner speed), N_Eng_rpm (engine speed), T_LOAD (tensioner load), Load_Cell (load cell signal), N_Eng_V_2_rpm, N_Eng_rpm_offset, K_Load are scalar.

Referring again to FIG. 8, a lead screw force error, created from the difference between a target lead screw force and the measured lead screw force, is conditioned before being provided to the proportional-integral-derivative ("PID") controller by means of the dead-zone treatment. The PID controller dead band sets the error to "0" if it is contained inside a predetermined calibrated range. The controller stops movement of the actuator and thereby of the lead screw when the lead screw force error falls within the predetermined calibrated range. If the lead screw force error exceeds the calibrated range, the controller activates the actuator in order to bring the measured lead screw force back within the calibrated range.

Figure 9:
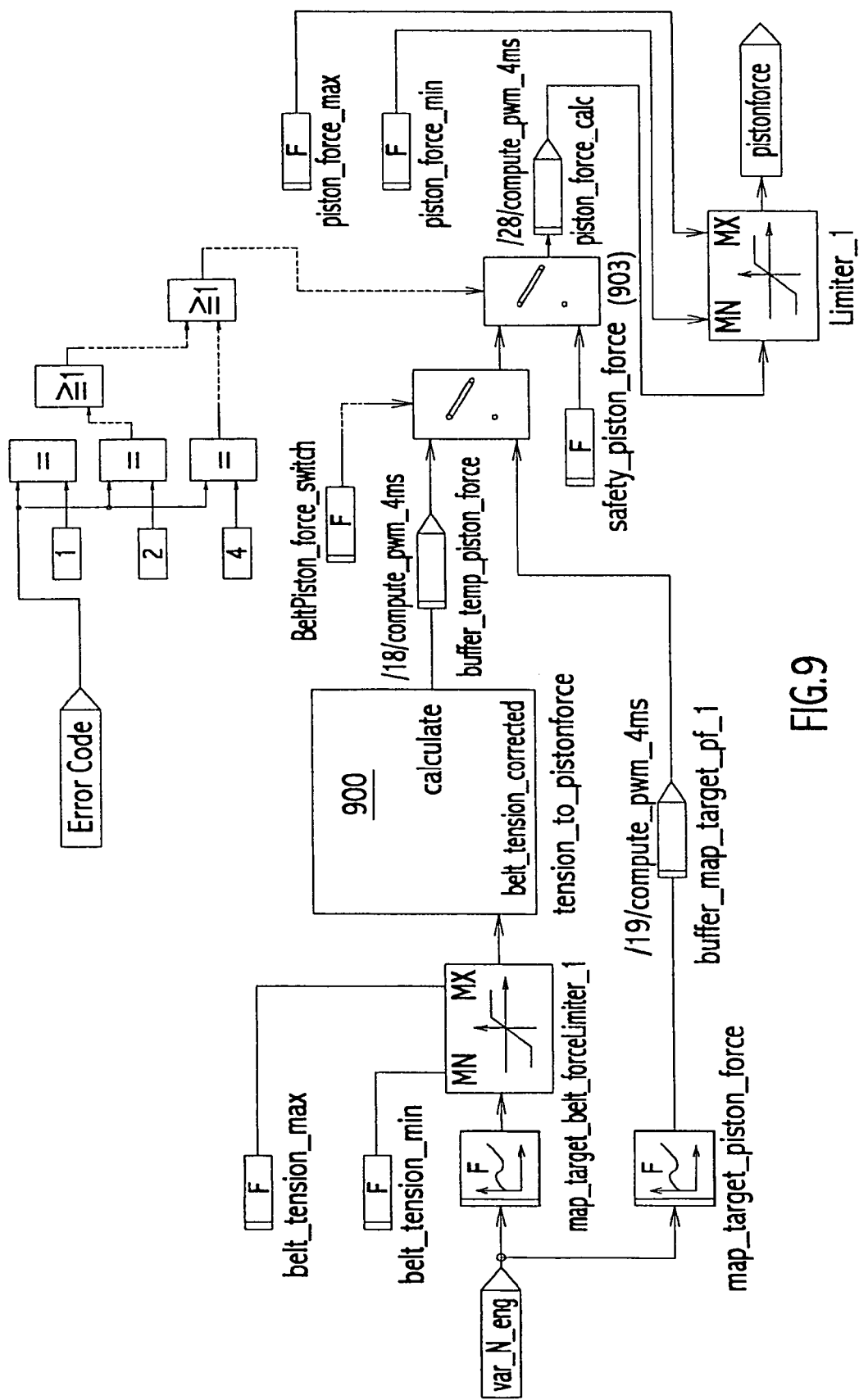
FIG. 9 is a logic diagram for compute piston force.

FIG. 9 is a logic diagram for compute target piston force (pistonforce). Tension_to_piston_force 900 calculates a belt tension based upon a known lead screw force. Map_target_belt_force_Limiter_1 limits a lead screw force between a maximum and minimum value (belt_tension_max, belt_tension_min). So long as a maximum and minimum lead screw force is not exceeded, a target piston (lead screw) force 903 is generated. The target lead screw force is compared against a load cell signal. A control signal is then generated by the controller to adjust a lead screw position and thereby a belt tension as required. An exemplary belt tension range is approximately 0N to 3000N which corresponds to a piston force range of approximately 0N to 1000N. The calculations are performed on 0.004 second intervals, however, the interval can be adjusted as required by operational conditions.

Figure 10:
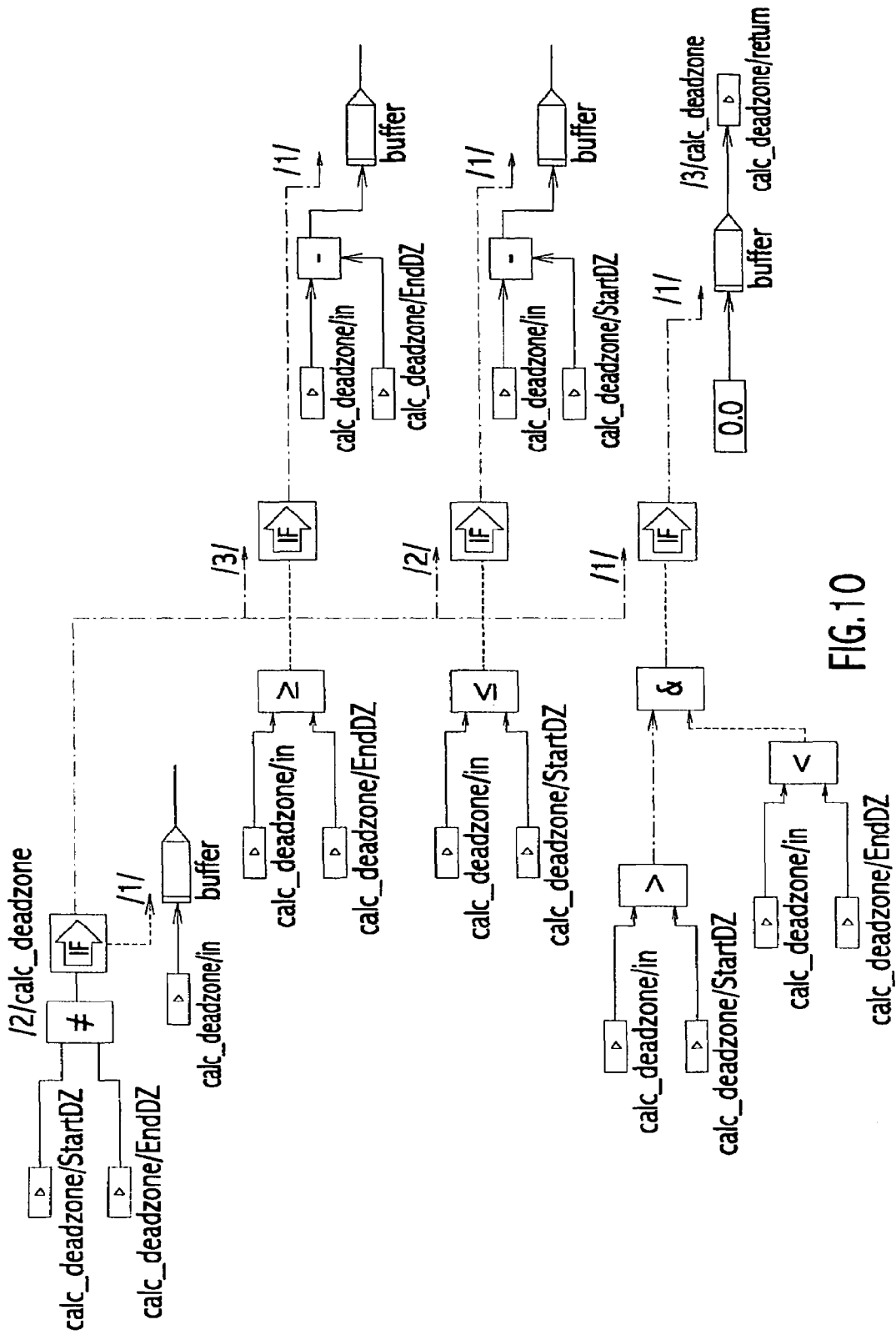
FIG. 10 is a logic diagram for the deadzone.

FIG. 10 is a logic diagram for the deadzone. The implemented deadzone ensures that there is a calibratable region where no control action takes place, thereby implementing the infinite damping feature. As long as the calibratable parameters StartDZ and EndDZ are not identical, a class returns to "0" for input arguments lying within the noted bound. If the deadzone bounds are identical, the input argument is returned unchanged. For input signal values outside the bounds, the parameters StartDZ and EndDZ are subtracted as appropriate. The "calc_" prefix refers to calculation of the subject variables.

Figure 11:
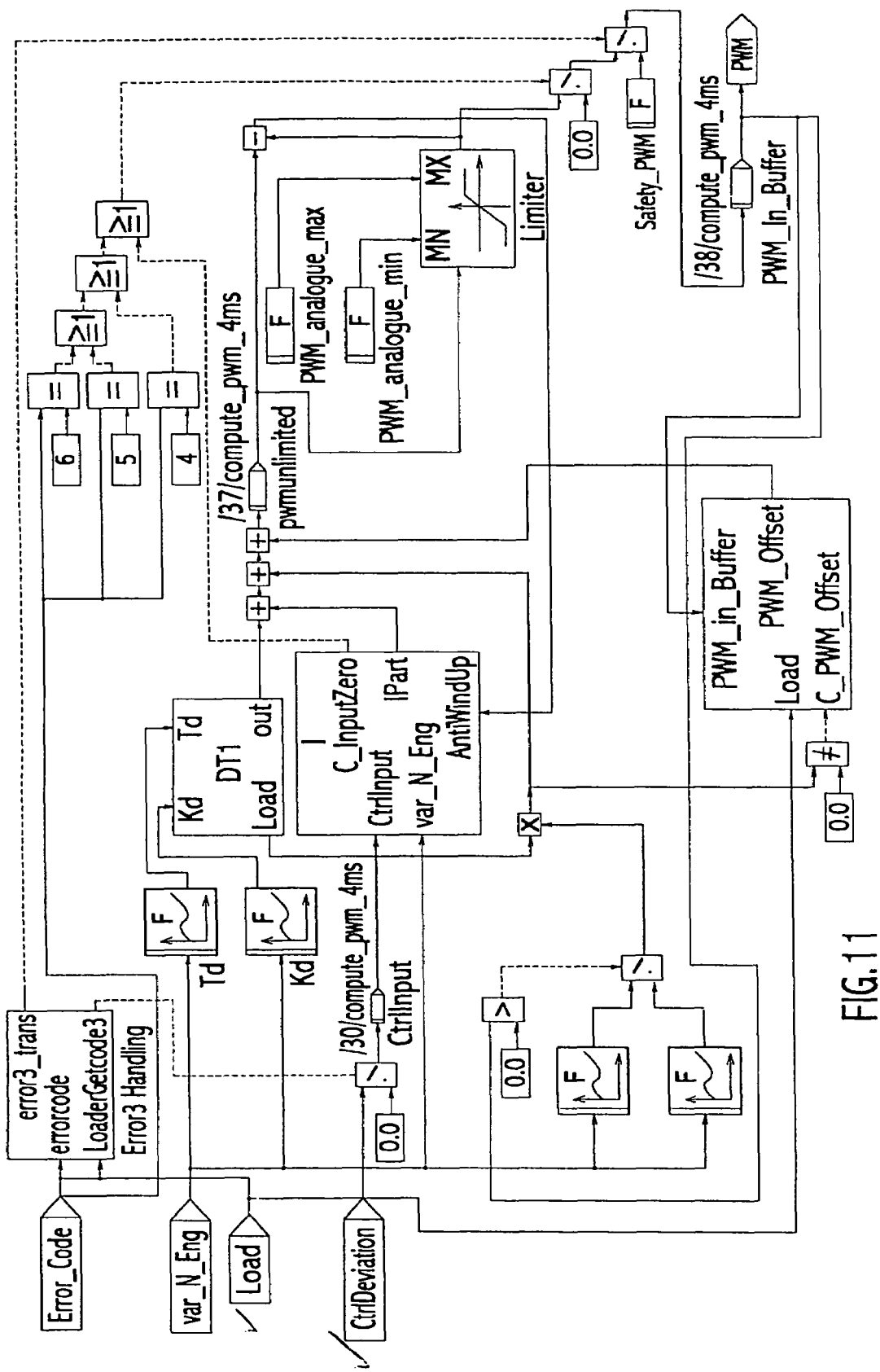
FIG. 11 is a logic diagram for anti-windup.

FIG. 11 is a logic diagram for anti-windup. See FIG. 13 for a logic diagram for hierarchy I. See FIG. 14 for a logic diagram for hierarchy DT1. "CtrlDeviation" refers to control deviation piston force. "Load" refers to piston load. "var_N_Eng" refers to engine speed. "PWM" refers to pulse width modulation and "compute" is compute.

Figure 12:
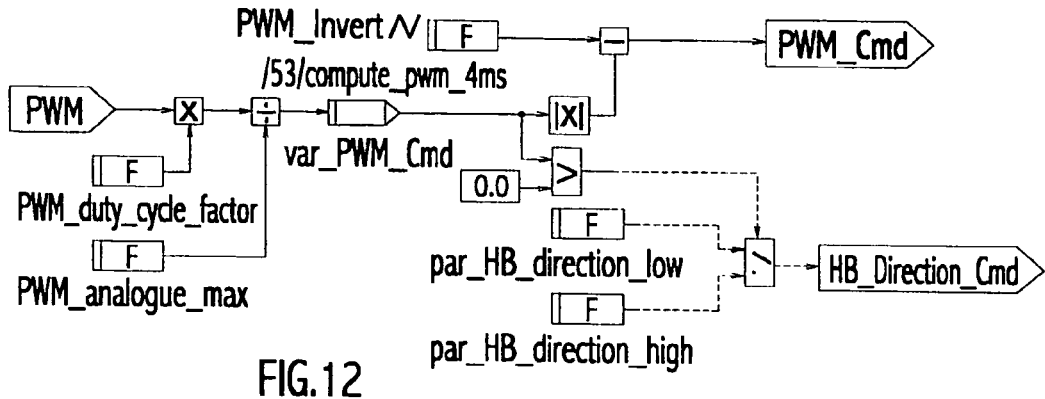
FIG. 12 is a logic diagram for convert signals.

FIG. 12 is a logic diagram for convert signals. This is the conversion from the standard PWM values calculated by the high-level control and the value that can be interpreted by the processor. For example, the value calculated by the processor/controller can vary between −100 and +100 (− and + are two senses of rotation) and are translated for the low-level software driver in two values, the first sign is for polarity (direction) and the second value is the final PWM value calculated as follows:

$$PWM\_Cmd = 100 - PWM$$

Where PWM_Cmd is the value transmitted to the actuator 400 and PWM is the value calculated by the high level control. "HB_direction" generally refers to the direction of the electric motor. "HB_Direction_Cmd" refers to the command signal as to electric motor direction.

Figure 13:
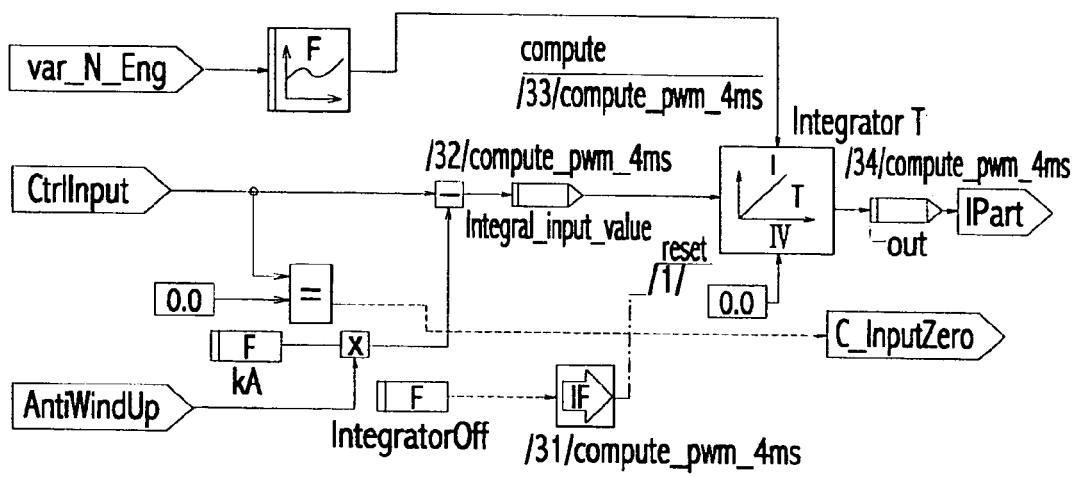
FIG. 13 is a logic diagram for hierarchy I.

FIG. 13 is a logic diagram for hierarchy I. This is the anti-wind up integrator control belonging to the PID control. The look-up table T1 can provide different integrator gains according to the engine rotational speed (gain scheduling). The anti-wind up contribution is tuned by the single scalar gain kA. The parameter "IntegratorOff" allows an operator to switch the integrator off manually if necessary. "CtrlInput" is input to the PID controller as to tensioner position. "Integral_input_value" is a scalar integral controller input term.

Figure 14:
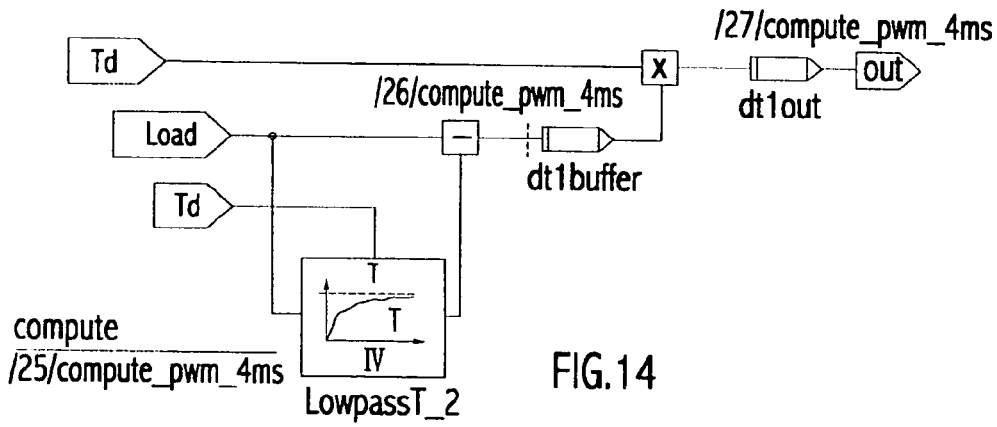
FIG. 14 is a logic diagram for hierarchy dt1.

FIG. 14 is a logic diagram for hierarchy DT1 belonging to the PID control. The derivative contribution is tuned by the gain Kd. "dt1buffer" is a scalar memory term and "dt1out" is a scalar output DT1 term.

Figure 15:
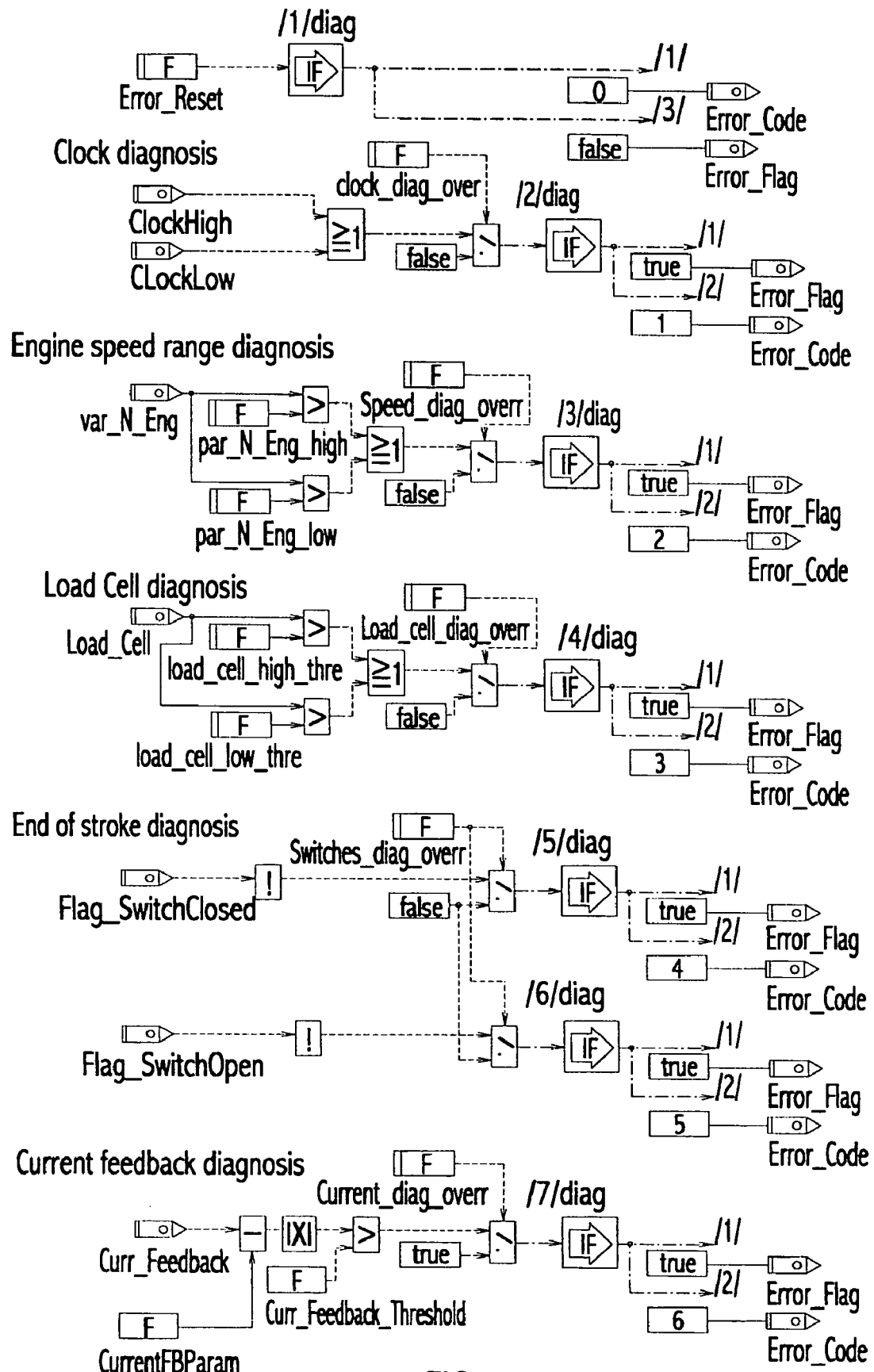
FIG. 15 is a logic diagram for diagnostics and recovery mechanisms.

FIG. 15 is a logic diagram for diagnostics and recovery mechanisms. The diagnostics include clock diagnosis (high/low thresholds), engine speed range diagnosis (high/low thresholds), load cell (high/low thresholds), end of stroke for limit switch diagnosis (switch open/closed), and actuator motor current feedback diagnosis (high threshold on over current). Each sets an error flag as indicated.

Figure 16:
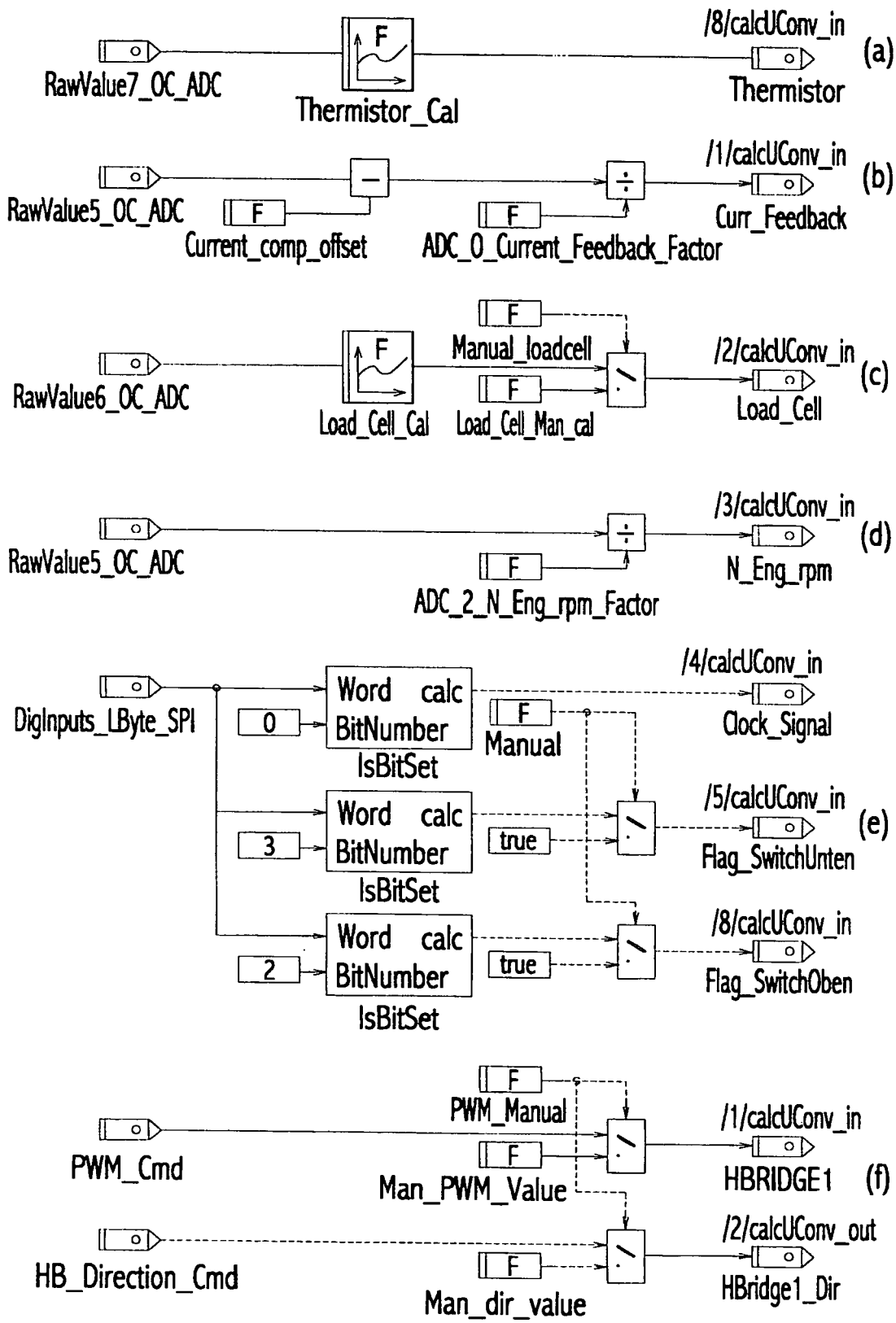
FIG. 16($a$) is a logic diagram for the thermistor input.

FIG. 16(a) is a logic diagram for the thermistor input. A thermistor signal (RawValue7_OC-ADC) is received from an engine control unit. This may be used to map an operating temperature history for the belt as described elsewhere in this specification.

FIG. 16(b) is a logic diagram for the actuator current feedback calculation. Actuator current feedback (RawValue5_OC_ADC) and feedback factor (ADC_O_Current_Feedback_Factor) are used to identify an atypical operating condition, for example, a locked rotor condition which requires deactivation of the actuator. A locked rotor will result in an unusually high current draw by the actuator. A locked rotor condition may occur as a result of an obstruction in the travel range of the lever arm, or, due to failure of a limit switch at either end of a range of motion.

FIG. 16(c) is a logic diagram for the load cell calibration. Load cell calibration may occur at each engine start using a second load cell used as a reference. In the instant system the load cell calibration (relationship voltage [mV] to load[N]) is performed during the fabrication phase and remains inside a specified tolerance during the operating life of the sensor.

FIG. 16(d) is a logic diagram for the engine speed calculation. Engine speed is used to determine a belt tension. It is also used to determine a cumulative operating life history in order to predict a belt life duration.

FIG. 16(e) is a logic diagram for the auto/manual control of the PWM. The PWM may be controlled manually (MANUAL) in addition to the automatic mode described herein. In manual mode a vehicle operator or technician can input a desired belt tension. The input belt tension may only be between predetermined range limits in order to avoid overstressing the belt. Manual mode may also be used to clear operating faults in the system.

FIG. 16(f) is a logic diagram for HBRIDGE1. This controls the electric motor rotational direction (HBridge1_Dir). H-bridge circuits are well known in the art for driving DC motors.

Figure 17:
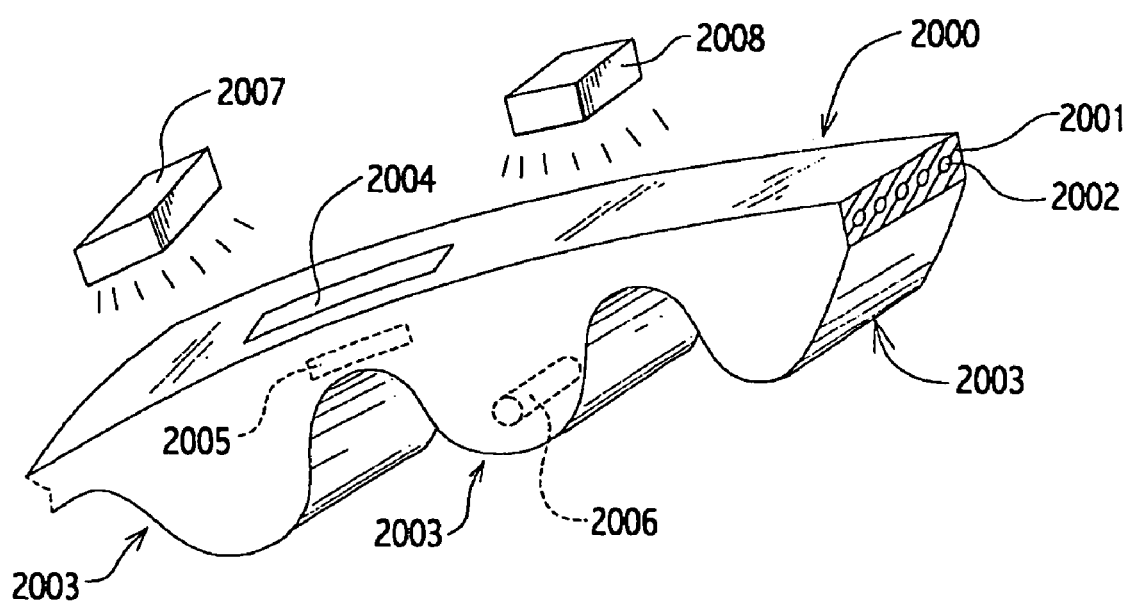
FIG. 17 is a side view of a reference tooth belt.

FIG. 17 is a side view of a reference tooth belt. Toothed belt 2000 comprises elastomeric body 2001. Tensile members 2002 are embedded within the body 2001. Tensile members 2002 may comprise strands of polyamide, aramid, polyester, and all equivalents.

Elastomeric body 2001 may comprise natural and synthetic rubbers, including but not limited to polychloroprene, alkylated chlorosulphonated rubber, polybutadiene, hydrogenated nitrile butadiene rubber (HNBR), or EPDM, as well as the equivalents and combinations of any two or more of the foregoing.

Teeth 2003 project from a pulley engaging portion of belt 2000. The inventive belt comprises a means of identifying a particular location or locations on the belt while a belt drive system is in operation. In the case of a toothed belt this would allow any tooth on the belt to be located. This information would then be used for monitoring as disclosed in this specification.

The means of achieving a reference mark on a belt are several. For example, a contrasting color strip 2004 may be put on a belt outer surface for detecting by an optical sensor 2007. Strip 2004 may also comprise a powdered material having suitable magnetic properties for detection by a magnetic sensor 2008.

In another example, insert 2005 and or insert 2006 are molded into a tooth 2003 or in to a belt body. Insert 2006 and insert 2005 may comprise any device capable of detection by magnetic, electric, Hall effect, capacitive or other means. Sensors 2007 and 2008 are connected to the active tensioner controller.

Although a single form of the invention has been described herein, it will be obvious to those skilled in the art that variations may be made in the construction and relation of parts without departing from the spirit and scope of the invention described herein.

We claim:

1. A tensioner comprising:
   an electric actuator;
   a force imparting member engaged with a lever arm;
   a pulley journalled to the lever arm, the pulley engagable with a belt;
   the force imparting member engaged with the electric actuator whereby the force imparting member is axially moveable by the electric actuator;
   a load sensor coaxially engaged with the force imparting member, the load sensor detecting and transmitting a load signal to a controller; and
   the controller using the load signal to control a force imparting member position.

2. The tensioner as in claim 1, wherein:
   the force imparting member comprises a lead screw;
   the lead screw rotatably engaged with a threaded collar.

3. The tensioner as in claim 1, wherein the electric actuator comprises an electric motor.

4. The tensioner as in claim 1, wherein the force imparting member is engaged with the electric actuator through a gear transmission.

5. The tensioner as in claim 1, wherein:
   the load sensor further comprises a bore, the load sensor coaxially engaged with the force imparting member through the bore.

6. The tensioner as in claim 1, wherein the lever arm is pivotally engaged with a mounting surface.

7. A system for adjusting a tension of an endless belt comprising:
   a tensioner having a toroid load sensor and a pulley journalled to a lever arm, the pulley in contact with an endless belt for applying a belt load to the endless belt;
   the toroid load sensor detecting a belt load and transmitting a belt load signal to a controller; and
   the controller using the belt load signal to select a pulley position for a belt load.

8. The system as in claim 7, wherein the tensioner further comprises:
   an axially moveable member moveable by an electric actuator;
   the lever arm engaged with the axially moveable member; and
   the toroid load sensor coaxially engaged with the axially removeable member.

9. The system as in claim 8, wherein:
   the electric actuator further comprises an electric motor, the electric motor engaged with the axially moveable member through a gear reduction transmission.

10. A method of controlling a belt load comprising the steps of:
    engaging a belt with a pulley, the pulley journalled to a pivoting lever arm;
    positioning the lever arm for a belt load;
    using a toroid load cell to detect a belt load;
    selecting a belt load value corresponding to a desired belt load;
    comparing the belt load to the belt load value;
    determining a new lever arm position based upon said belt load value; and
    moving the lever arm to the new lever arm position to set the belt load to the belt load value.

11. The method as in claim 10 comprising:
    detecting an engine parameter; and
    selecting a belt load value with respect to the engine parameter.

12. A method of tensioning a belt comprising the steps of:
    engaging a tensioner having a toroid load sensor with a belt;
    adjusting the tensioner position to impart a belt load to the belt;
    detecting the belt load with the toroid load sensor;
    comparing the detected belt load with a desired belt load; and
    adjusting the tensioner position with a controller until the detected belt load is substantially equal to the desired belt load.

13. The method as in claim 12 comprising the steps of:
    selecting the desired belt load with respect to an engine operating parameter.

14. The method as in claim 13 comprising the step of:
    selecting the desired belt load with respect to an engine operating speed.

15. The method as in claim 13 comprising the step of:
    detecting an engine operating temperature;
    selecting the desired belt load with respect to the engine operating temperature.

16. The method as in claim 15 comprising the step of storing an engine temperature history in a controller memory.

17. The method as in claim 12 comprising the step of selecting the desired belt load from a look up table.

18. The method as in claim 12 comprising the steps of:
    using a reference tooth on the belt;
    detecting each passage of the reference tooth with a sensor to determine cumulative belt cycles;
    storing the cumulative belt cycles in a memory for analysis of a belt fatigue condition; and
    informing a user.

19. A method of computing a belt modulus comprising the steps of:
    engaging a tensioner having a load sensor with a belt;
    adjusting the tensioner to a first position (P1) to impart a first belt load (L1) to the belt;
    detecting the first belt load (L2) with the load sensor;
    adjusting the tensioner to a second position (P2) to impart a second belt load (L2) to the belt;
    detecting the second belt load (L2) with the load sensor; and
    computing a belt modulus using (L1), (L2), (P1), (P2).

20. The method as in claim 19 further comprising the steps of:
  storing the calculated belt modulus values in a controller memory;
  comparing the calculated belt modulus values to identify a belt modulus trend; and
  informing a user.

21. The method as in claim 19 comprising the steps of:
  using a first limit switch to detect the first position (P1); and
  using a second limit switch to detect the second position (P2).

22. The method as in claim 19 comprising the steps of:
  adjusting the tensioner by driving the tensioner with a fixed duty cycle for a first duration to position (P1); and
  adjusting the tensioner by driving the tensioner with a fixed duty cycle for a second duration to position (P2).

23. A method of computing a belt modulus comprising the steps of:
  engaging a tensioner having a load sensor with a belt;
  adjusting the tensioner to impart a first belt load (L1);
  detecting the first belt position (P1) with a limit switch;
  adjusting the tensioner to impart a second belt load (L2);
  detecting the second belt position (P2) with a limit switch; and
  computing a belt modulus using (L1), (L2), (P1), (P2).

24. The method as in claim 23 further comprising the steps of:
  storing the calculated belt modulus values in a controller memory;
  comparing the calculated belt modulus values to identity a belt modulus trend; and
  informing a user.

25. A tensioner comprising:
  an electric actuator;
  a lead screw engaged with a lever arm;
  a pulley engagable with a belt, the pulley journalled to the lever arm;
  the lead screw engaged with the electric actuator whereby the lead screw is inoveable by the electric actuator;
  a load sensor coaxially engaged with the lead screw, the load sensor transmitting a load signal to a controller; and
  the controller using the load signal to control a lead screw position.

26. The tensioner as in claim 25, wherein the electric actuator comprises an electric motor.

27. The tensioner as in claim 25, wherein the lead screw is engaged with the electric actuator by a gear transmission.

28. The tensioner as in claim 25, wherein:
  the load sensor comprises a toroid load cell having a bore;
  the toroid load cell coaxially engaged with the lead screw though the bore.

29. The tensioner as in claim 25, wherein the lever arm is pivotally engaged with a mounting surface.

30. The tensioner as in claim 25, wherein the lead screw is rotatably engaged with a collar.

* * * * *